United States Patent [19]

Houben

[11] Patent Number: 5,111,110

[45] Date of Patent: May 5, 1992

[54] METHOD OF DETERMINING A DISPLAY PARAMETER IN A PICTURE DISPLAY TUBE AND METHOD OF IMPROVING A PICTURE DISPLAY IN A PICTURE DISPLAY TUBE

[75] Inventor: Paulus A. Houben, Eindhoven, Netherlands

[73] Assignee: U.S. Philips Corporation, New York, N.Y.

[21] Appl. No.: 749,614

[22] Filed: Aug. 16, 1991

Related U.S. Application Data

[63] Continuation of Ser. No. 527,993, May 22, 1990, abandoned.

[30] Foreign Application Priority Data

May 24, 1989 [NL] Netherlands ............. 8901295

[51] Int. Cl.[5] ............................. H04N 17/02
[52] U.S. Cl. ........................ 315/10; 315/382; 358/10; 358/69
[58] Field of Search ............. 315/10, 382, 368; 358/69, 10

[56] References Cited

U.S. PATENT DOCUMENTS

| | | | |
|---|---|---|---|
| 4,193,086 | 3/1980 | Kawaguchi | 358/10 |
| 4,263,614 | 4/1981 | Tominaga | 358/69 |
| 4,364,083 | 12/1982 | Isono et al. | 358/69 |
| 4,387,394 | 6/1983 | Powell | 315/10 |
| 4,814,669 | 3/1989 | Herrmann et al. | 315/10 |

Primary Examiner—Theodore M. Blum
Attorney, Agent, or Firm—Robert J. Kraus

[57] ABSTRACT

A method of determining display parameters of an electron beam picture tube. An image pattern is produced on the display screen of the tube by frequency modulating the electron beam. The frequency component of the image pattern having a frequency equal to the beam modulation frequency, that being the fundamental wave of the pattern, is determined. Information about the sharpness of focus can be derived from the modulation depth of the fundamental wave, and information about the position of the electron beam and raster distortion can be derived from the phase of the fundamental wave.

10 Claims, 5 Drawing Sheets

METHOD OF DETERMINING A DISPLAY PARAMETER IN A PICTURE DISPLAY TUBE AND METHOD OF IMPROVING A PICTURE DISPLAY IN A PICTURE DISPLAY TUBE

This is a continuation of application Ser. No. 07/527,993, filed May 22, 1990.

BACKGROUND OF THE INVENTION

The invention relates to a method of determining a display parameter in a picture tube which comprises a system for emitting a frequency-modulated electron beam, a modulated image pattern being produced on the display screen of the picture tube, and the display parameter being determined from the image pattern.

The invention also relates to a method of improving a picture display in a picture tube.

A method of the type defined in the opening paragraph is disclosed in the European Patent Application 0,281,195, corresponding to U.S. Pat. No. 4,814,669, in which a method of determining the position of an electron beam is described. The prior-art picture tube includes a colour selection electrode. The colour selection electrode has apertures. The modulation frequency of the electron beam differs from the modulation frequency of the colour selection electrode. Modulation frequency of the electron beam must here be understood to mean $2\pi$ divided by the distance between maxima in the intensity of the electron beam. The modulation frequency of the colour selection electrode must be understood to mean $2\pi$ divided by the spacing between the apertures in the colour selection electrode. A triad of phosphor dots or lines is present on the display screen for each aperture in the colour selection electrode. Consequently, the modulation frequency of the phosphor pattern, i.e. $2\pi$ divided by the distance between consecutive phosphor elements of the same colour, is substantially equal to the modulation frequency of the colour selection electrode. A modulated picture pattern results on the picture screen having a frequency equal to the difference between the modulation frequency of the electron beam and the modulation frequency of the phosphor pattern. The position of the electron beam can be determined from this picture pattern. This method has the disadvantage that other display parameters, for example the accuracy of focusing on the picture screen cannot be determined. The simultaneous determination of more than one display parameters would save time and consequently costs.

SUMMARY OF THE INVENTION

It is an object of the invention to provide a method by which (also) other display parameters, such as the sharpness of the focus can be determined.

To this end, according to the invention the method is characterized, in that the image pattern is analysed to determine the frequency component of the image pattern at a frequency substantially equal to the modulation frequency of the electron beam.

More than one display parameter can then be determined from this frequency component.

The modulation depth of this frequency component, that is to say the ratio of the amplitude and the mean value of the intensity, is a measure of the sharpness of the focus of the electron beam on the picture screen. With the aid of modulation depth measurements the influence of parameters on the focus can be determined, setting the focus can be improved and the sharpness of the focus can be determined.

The phase of this frequency component (the fundamental wave) is a measure of the position of the electron beam. For a colour picture tube the phases of the fundamental wave for the red, the green and the blue electron beams can be mutually different. These differences are a measure of the convergence of the three electron beams. Comparing the position of the fundamental waves for an electron beam in different positions on the picture screen provides information about raster deviations.

An embodiment of the method according to the invention, in which the picture tube is a colour picture tube provided with a colour selection electrode having apertures arranged in a pattern having a modulation frequency, is characterized in that the modulation frequency of the electron beam is less than or equal to approximately the modulation frequency of the colour selection electrode.

If the modulation frequency of the electron beam is higher than approximately the modulation frequency of the colour selection electrode then oscillations occur in the image pattern, which render it difficult to determine the frequency component.

Preferably, the modulation frequency of the electron beam is greater than or equal to one-hundredth of the modulation frequency of the colour selection electrode.

If the modulation frequency of the electron beam is less than one-hundredth of the modulation frequency of the colour selection electrode then average display parameters are determined over a comparatively large portion of the picture screen; a variation of a display parameter is then difficult to determine.

Preferably an image pattern is formed which is modulated in two directions which are at right angles with respect to each other.

It is then possible to determine display parameters simultaneously for different directions.

In an embodiment the image pattern contains a regular matrix of points. Such an image pattern is modulated in many directions.

A further embodiment of the method according to the invention, in which the picture screen is provided at an interior side of a display window, is characterized, in that the fundamental frequency component of the image pattern is determined, followed by a treatment of the picture tube, whereafter the fundamental frequency component of the image pattern is again determined, and the frequency component determined last is compared to the previously determined frequency component.

Thus, it can be determined in a rapid and simple manner whether and to what extent a treatment of the picture tube, for example a treatment of the display window in which the display window is provided with an exterior anti-reflection layer, influences the picture quality.

BRIEF DESCRIPTION OF THE DRAWINGS

Some embodiments of the invention will now be described in greater detail with reference to the accompanying drawing figures, in which.

The figures are shown schematically and not to scale, corresponding components in the different embodiments usually having been given the same reference numerals.

DESCRIPTION OF THE PREFERRED EMBODIMENTS

Figure 1:
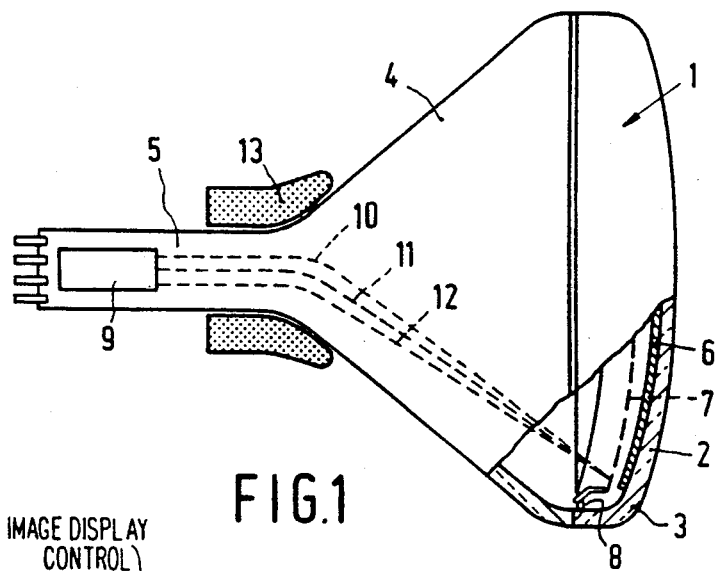
FIG. 1 shows a colour picture display device.

FIG. 1 shows a colour picture display device, in this case a colour cathode-ray tube of the in-line type having a colour selection electrode. In a glass envelope 1, which comprises a display window 2 having an edge 3, a cone 4 and a neck 5, an in-line electron gun 9 which generates three electron beams 10, 11 and 12 which have their axes located in the plane of the drawing, is arranged in the neck. The axis of the central electron beam 11 coincides, in the non-deflected state, with the tube axis. At its interior side the display window 2 is provided with a picture screen 6 comprising a phosphor pattern of a large number of triads of phosphor elements. The elements may consist of, for example, lines or dots. In the present case the colour picture tube contains linear elements. Each triad includes a line containing a green luminescent phosphor, a line containing a blue luminescent phosphor and a line containing a red luminescent phosphor. The phosphor lines are perpendicular to the plane of the drawing. A colour selection electrode 7 having a large number of apertures through which the electron beams 10, 11 and 12 emerge, is positioned in front of the picture screen 6. This colour selection electrode is suspended from the edge 3 of the display window 2 by means of suspension means 8. The three electron beams are deflected across the picture screen by the deflection coil system 13.

Figure 2:
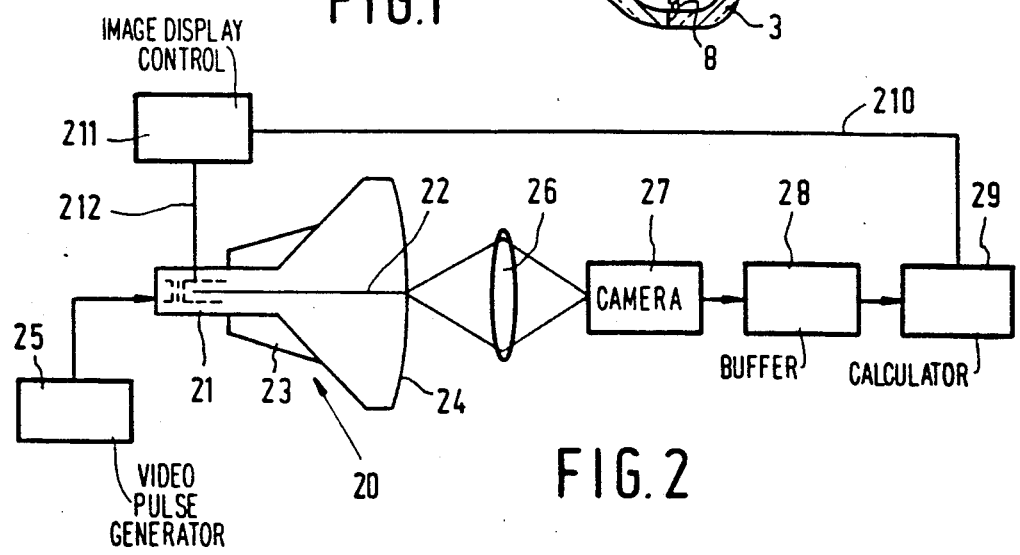
FIG. 2 is a schematic diagram of a measuring system.

FIG. 2 is a schematic view of a measuring set-up. In colour picture tube 20 an electron gun 21 generates an electron beam 22, this electron beam 22 is deflected by the deflection system 23 across the display screen 24 of the colour picture tube 20. Video-pulse generator 25 modulates the electron beam 22 with, for example, a modulation frequency of, for example, less than once and greater than one-hundredth of the modulation frequency of the phosphor pattern. When the tube includes a colour selection electrode, the modulation frequency of the phosphor pattern and of the colour selection electrode are usually the same. Using a lens or a lens system 26 the image pattern formed on the display screen 24 is applied to a pick-up device, for example a camera 27. The pick-up data taken by the camera are applied through a buffer device 28 to a calculator 29. In this calculator 29 the frequency component of the image pattern is determined which has a frequency substantially equal to the modulation frequency of the electron beam. This frequency component will be denoted the "fundamental wave" in the sequel of this description. In a first step, for example by means of averaging or projection, as will be explained with reference to FIGS. 3b and 3c, a luminance pattern from which the fundamental wave is determined, can be determined from the image pattern. A display parameter is determined from the fundamental wave. The information obtained can be used to improve the image display. By means of feed-through line 210 information about the display parameter is applied to apparatus 211. This apparatus controls a parameter important for the image display. Parameters important for the image display are, for example, energizing potentials for an electrode or electrodes of the electron gun 21, energizing potentials for the display coil system 23, and/or the position of one or more components of the display system 23. In this example the apparatus controls a potential of an electrode of the electron gun 21 via supply lead 212. Such a feedback renders it possible to investigate the relationship between a display parameter and a parameter important for the image display and to improve the image display. Information about the display parameter is thus used to control a parameter important for the image display.

Figure 3A:
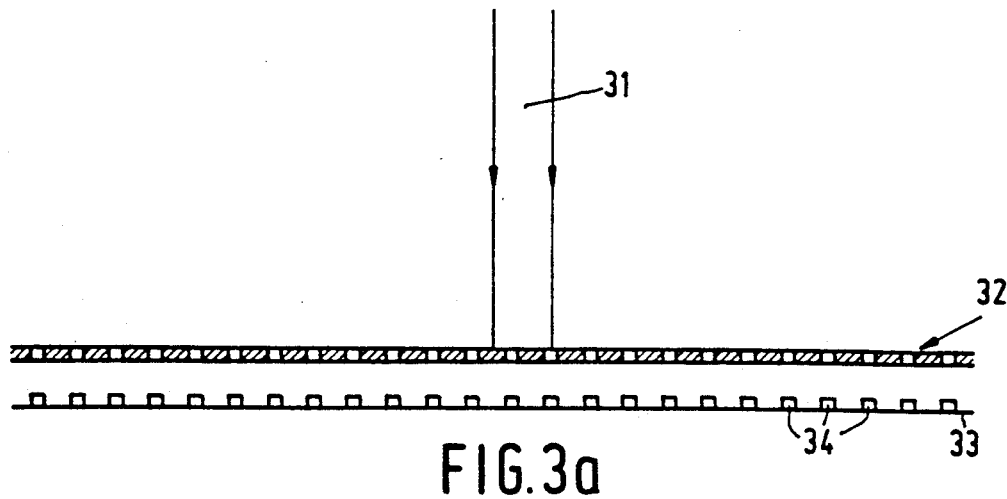
FIGS. 3a, 3b and 3c illustrate the method of the invention.
Figure 3B:
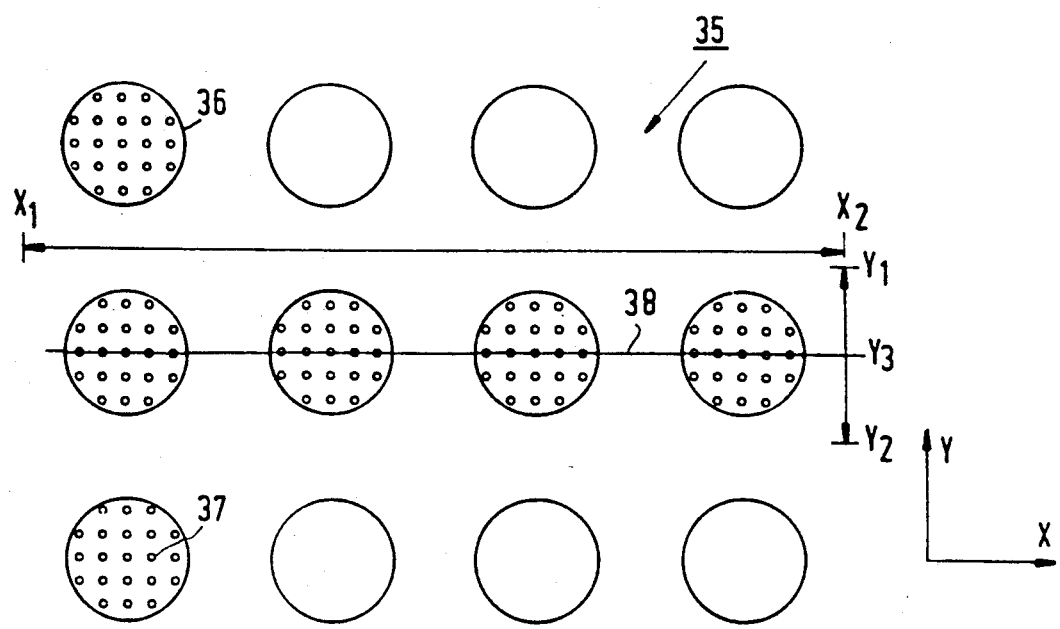
Figure 3C:
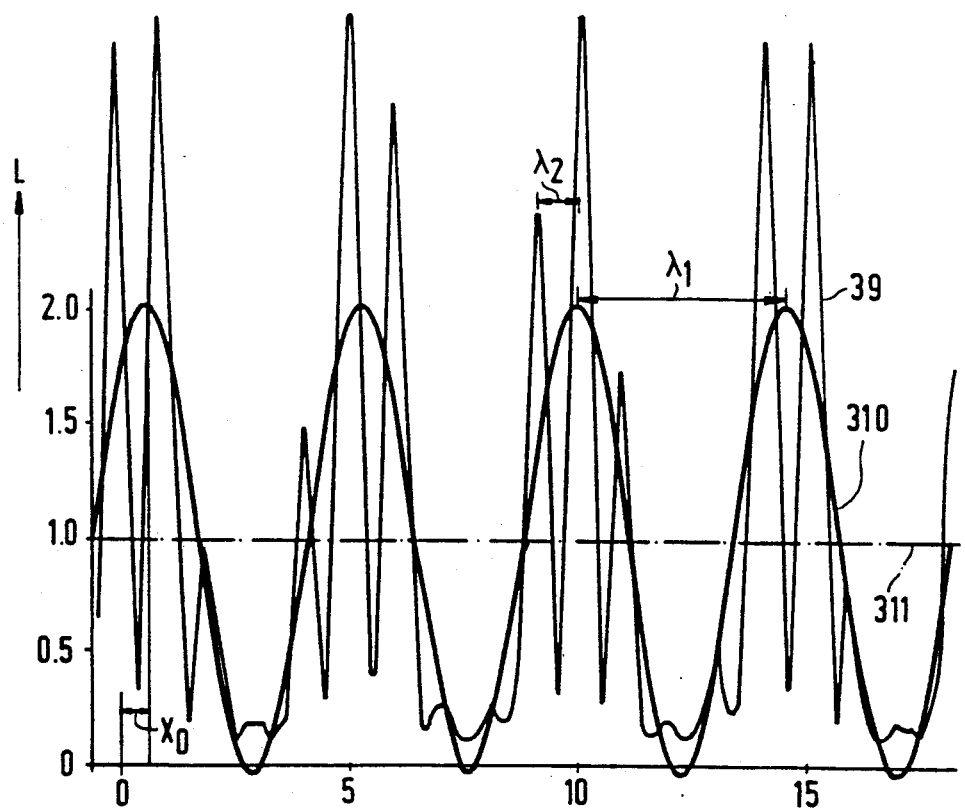

FIGS. 3a, 3b and 3c illustrate the method of the invention. FIG. 3a shows schematically the modulated electron beam 31 which passes through the apertures of a colour selection electrode 32 and impinges on the display screen 33 on the phosphor elements 34. FIG. 3b shows a matrix 35 of picture elements 36 visible on the display screen. Each element 36 is assembled from microdots 37. The luminance L is a function of both the x and the y position. A fundamental wave of the matrix pattern in the x-direction can, for example, be determined as follows. Along a random or a predetermined section 38 through the matrix 35 between $x_1$ and $x_2$ each element $x_i$ between $x_1$ and $x_2$ is given a function value $F(x_i)$ proportional to the luminance value $L(x_i, y=y_3)$ in this element:

$$F(x_i) = \text{constant} * L(x_i, y=y_3)$$

The fundamental wave can be determined therefrom. The fundamental wave can be determined with greater accuracy if a function value $F'(x_i)$ proportional to the maximum luminance value between $y_1$ and $y_2$ is assigned to elements $x_i$, that is to say the function value $F'(x_i)$ is determined by means of projection:

$$F'(x_i) = L_{max}(x_i, y_1 < y < y_2)$$

In this example one row of elements 36 is present between $y_1$ and $y_2$. $y_1$ and $y_2$ can be chosen such that more than one row of elements 36 is present between $y_1$ and $y_2$.

The fundamental wave can be determined with a still greater accuracy when a function value $F''(x_i)$ proportional to the average luminance values occurring between $y_1$ and $y_2$ is assigned to elements $x_i$:

$$F''(x_i) = \text{constant} * \int_{y_1}^{y_2} L(x_i, y) dy/(y_1 - y_2)$$

The line 39 in FIG. 3c shows $F''(x)$ as a function of x between $x_1$ and $x_2$. The spatial fundamental wavelength of $F''(x)$, denoted by $\lambda_1$ in FIG. 3c, is approximately 4 times as great as the spatial wavelength of the phosphor pattern on the display screen, denoted by $\lambda_2$ in FIG. 3c, that is to say the modulation frequency of the electron beam, $2\pi/\lambda_1$, is approximately one-fourth the modulation frequency of the colour selection electrode, $2\pi/\lambda_2$. The horizontal axis indicates the position in $\lambda_2$. The fundamental wave can be calculated from F"(x) by means, for example, of a Fourier transform. The solid line 310 represents the given fundamental wave. This fundamental wave can analytically be described by:

$$F'''(x) = F'''_{av} + A \cos(2\pi/\lambda_1(x-x_0))$$

wherein F''' is the fundamental wave, $F'''_{av}$ is the average function value for the fundamental wave (denoted in FIG. 3c by line 311), and $A\cos(2\pi/\lambda_1(x-x_0))$ is the fluctuation around the average function value. $A/F'''_{av}$ is the modulation depth M; the higher the modulation depth the better the beam 31 is focused on the display screen 33. $x_0$ is a measure of the position of the beam.

For a plurality of patterns for an outer beam of the in-line electron gun, in this example a "red" electron beam, Table 1 compares the results of human observation and of a modulation depth measurement. For the central leg of the character m the optimum value of the focusing voltage in a focus lens in an in-line electron gun is determined by human observation. The optimum value is that value at which this central leg is displayed with the greatest possible sharpness. The $V_{focus}$-values denoted for the modulation depth measurements represent those values for $V_{focus}$ for which M is at its maximum. Likewise, the optimum value for the spacing between two m's (i.e. mm), that is to say that value for which the spacing between the m's is displayed with the highest possible sharpness to the eye, is determined by human observation. Always two values are given for the human observation, as the human observations have been effected by two persons. In addition, the Table shows for which focusing voltage the modulation depth for this central leg or the space between the m's, respectively, is at its maximum. The great similarity between human observations and the results of the modulation depth measurements will be obvious.

TABLE 1 comparison between optimum setting for $V_{focus}$ by human observation and by modulation depth measurements

|  | central leg of m | space between two m's |
| --- | --- | --- |
| human observation | 6620 | 6590 |
|  | 6620 | 6630 |
| modulation depth measurements | 6630 | 6600 |

Figure 4:
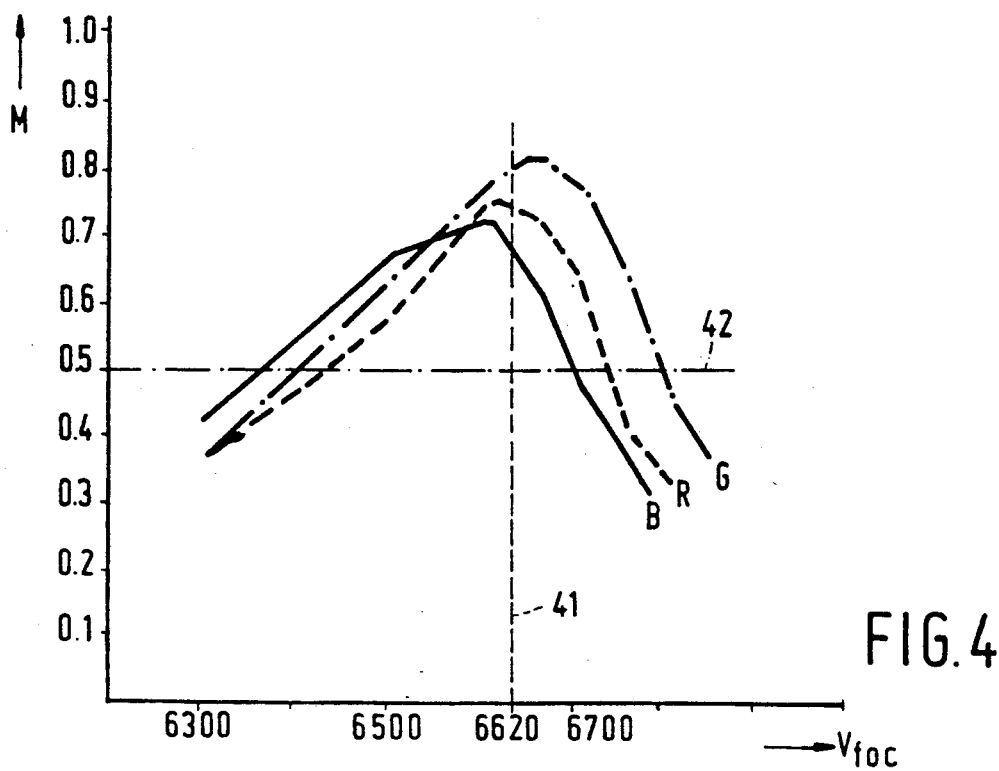
FIG. 4 shows in the form of a graph some results of the method in accordance with the invention.

FIG. 4 is a graph illustrating some results of the method in accordance with the invention. The horizontal axis shows the focusing voltage $V_{foc}$ in a main lens of the electron gun, in this example an in-line electron gun. The vertical axis represents the modulation depth M. Lines B, R and G represent the measured modulation depth as a function of $V_{foc}$ for the electron beams which impinge on the green (G), the red (R) and the blue (B) phosphors, respectively. The modulation depth has maxima for $V\approx6600$ V (for B and R) and $V\approx6650$ V (for G). Broken line 41 gives the optimum value of $V_{foc}$ such as it was determined from tests in which the brightness of the image was judged by a human observer. It will be obvious that this last value ($V_{foc}=6620$ V) has a good similarity to the results of the modulation depth measurements. The method of the invention does not only enable a fast determination of an optimum setting of $V_{foc}$, it also renders it clear whether and to what extent the optimum setting for $V_{foc}$ differs for the three individual electron beams. This may be an important indication for electron gun designers, and can render it possible to determine whether and in what manner the design of an electron gun should be altered in order to make $V_{foc}$ identical for the three electron beams, and consequently to obtain in improved image. It is alternatively possible to determine empirically which modulation depth is deemed acceptable on the basis of a predetermined criterion. In FIG. 4 a value 0.5 is chosen as an acceptable value for the modulation depth M, which value is represented by line 42. A modulation depth measurement can rapidly and simply provide an answer to the question whether the colour picture tube satisfies given quality requirements as regards legibility. It saves cost if a picture tube which does not satisfy these requirements is removed as rapidly as possible and in an earliest possible stage from the production line.

Three phases $x_0$ are determined by the fundamental waves for the three different electron beams. Comparing these phases provides information about the convergence of the three electron beams on the picture screen. Consequently, the method in accordance with the invention renders it possible to determine both the positions of the electron beams and the sharpness of the focus, and to determine at the same time whether the picture quality satisfies the imposed requirements as regards legibility, as well as to determine the influence of convergence and focus on the picture quality. It was found that an image which to the eye appears to be out of focus can be caused by both a non-optimum focus and by a non-optimum convergence or by a combination of these two image faults.

Figure 5A:
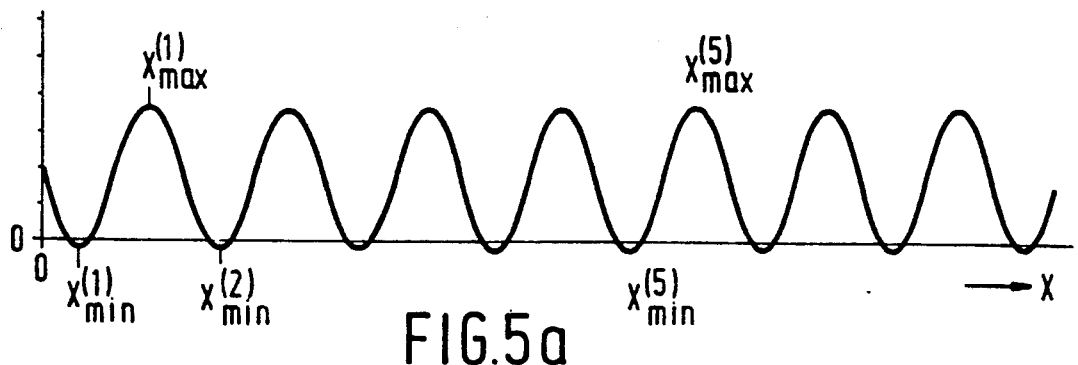
FIGS. 5a and 5b illustrate the manner in which raster deviations can be determined.
Figure 5B:
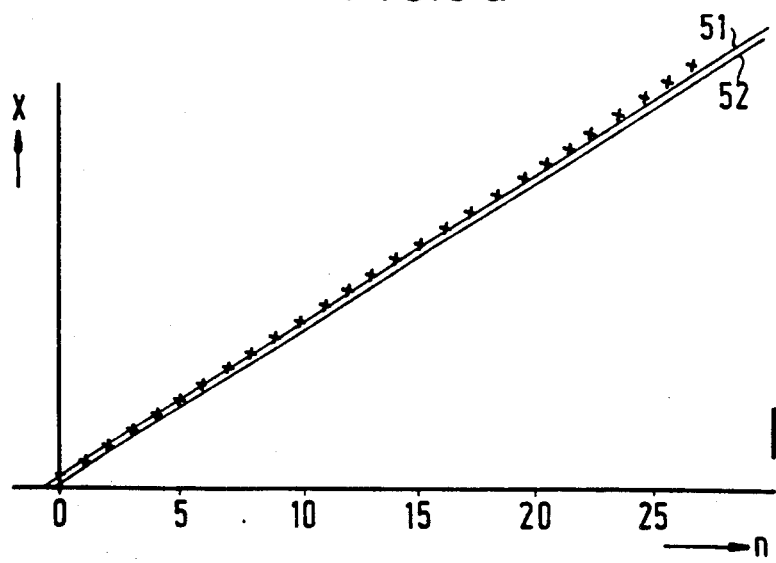

FIGS. 5a and 5b illustrate how a still further display parameter can additionally be determined. FIG. 5a shows the fundamental wave as a function of the distance (x) to the centre 0. The extremes are located in positions $x_{max}(n)$ for the maxima and $x_{min}(n)$ for the minima, wherein n is an integer. FIG. 5b shows, as a function of n, the distance between the centre of the tube and the extremes. If no raster distortion occurs then it holds that:

$$x_{max}(n) = x_{max}(0) + n*\lambda_1 \text{ and}$$

$$x_{min}(n) = x_{min}(0) + n*\lambda_1.$$

In FIG. 5b this is shown by straight line 51 (for $x_{min}$) and 52 (for $x_{max}$). The positions in which these lines intersect the vertical axis provide $x_{min}(0)$ and $x_{max}(0)$, respectively. The values for $x_{min}(n)$ are represented in FIG. 5b by crosses. Raster distortion results in the spatial wavelength not being constant over the entire screen, that is to say that $\lambda_1$ is a function of n. This causes the values for $x_{min}(n)$ to deviate for higher values of n from the straight line 51, as is evident from FIG. 5b, in which figures the values for $x_{min}(n)$ indicated by crosses. FIG. 5b is a schematical representation of a situation in which the raster is elongated towards the edges of the display screen. The raster distortion can be determined from these deviations. A comparison of the raster distortion for the three colours provides still further information.

Figure 6A:
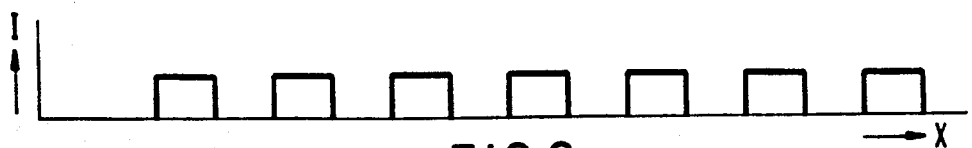
FIGS. 6a to 6d are examples of symmetrical image patterns.
Figure 6B:
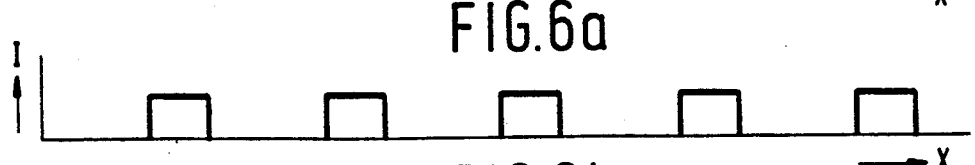
Figure 6C:
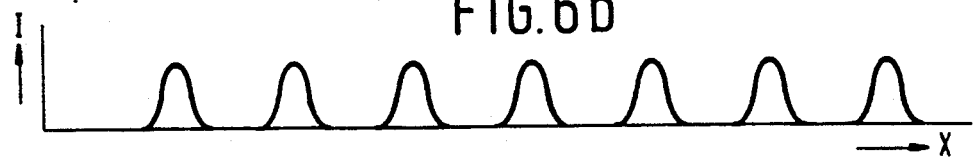
Figure 6D:
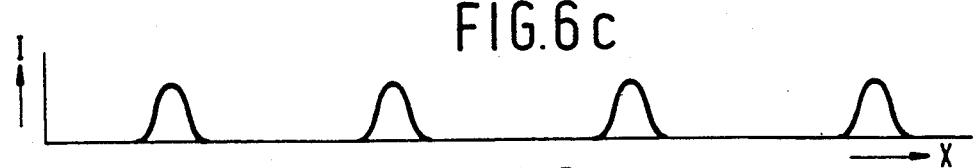
Figure 6E:
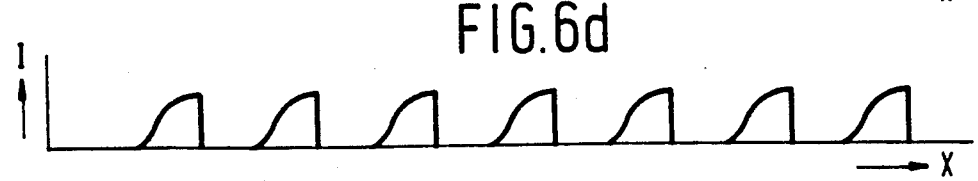
FIG. 6e shows an example of an asymmetrical image pattern.
Figure 7:
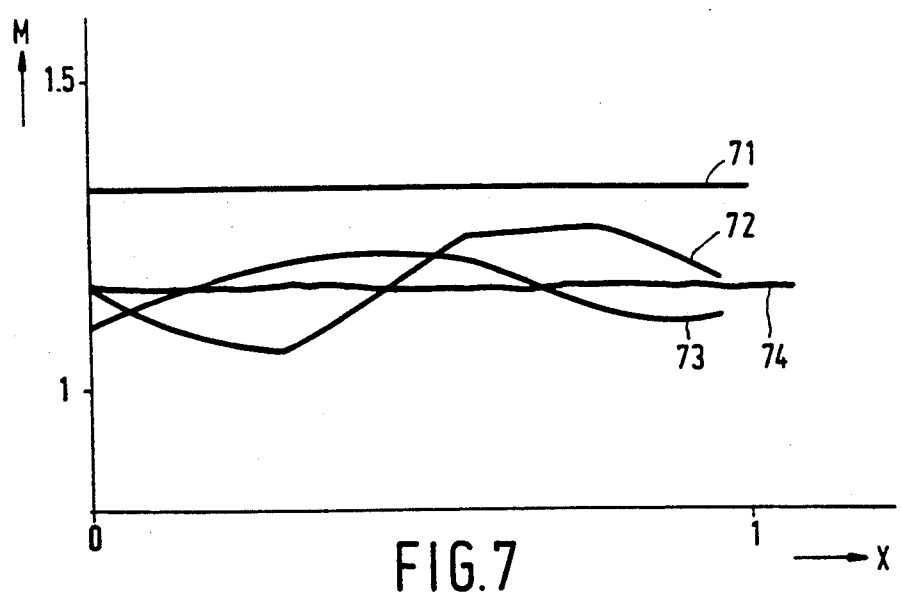
FIG. 7 illustrates the influence of the position of a colour selection electrode relative to the phosphor pattern on the modulation depth of the fundamental wave.

It should be noted that the method in accordance with the invention is suitable for use in both a colour picture tube without colour selection electrode and for a colour picture tube having a colour selection electrode. If the colour picture tube includes a colour selection electrode, then an image pattern containing a predominantly symmetrical pattern is preferably used. FIGS. 6a to 6d show some examples of symmetrical image patterns. FIG. 6e illustrates an asymmetrical image pattern. In these figures the intensity of the electron beam (I) is shown as a function of the position (x) of the electron beam. It has been found that for a symmetrical image pattern the influence on the fundamental wave thereof of the position of the colour selection electrode relative to the phosphor pattern is less than for an asymmetrical image pattern. To illustrate this, FIG. 7 shows the modulation depth as a function of the position of the colour selection electrode (expressed in the spatial wavelength $\lambda_2$ of the phosphor pattern). The modulation frequency of the image pattern is approximately $1/5^{th}$ the modulation frequency of the phosphor pattern. Line 71 in FIG. 7 represents the modulation depth determined from 4, 6 or more lines of an image pattern such as shown in FIG. 6c, lines 72, 73 and 74 in FIG. 7 represent the modulation depth M determined from 4, 6 and more than 10 lines, respectively, of an image pattern such as shown in FIG. 6e. It will be obvious that the modulation depth measurements for a symmetrical image pattern depend on a relatively low number of lines, as compared with an asymmetrical image pattern, for determining the effect of the position of the colour selection electrode relative to the phosphor pattern. This is an advantage, since the lower the number of lines which must be measured, the faster the display parameters can be determined. In this example the modulation depth M is approximately 1.32 for the symmetrical image pattern, approximately 1.17 for the asymmetrical image pattern. A variation of the modulation depth across the screen can provide an indication that asymetrical deviations, such as coma, occur.

Figure 8A:
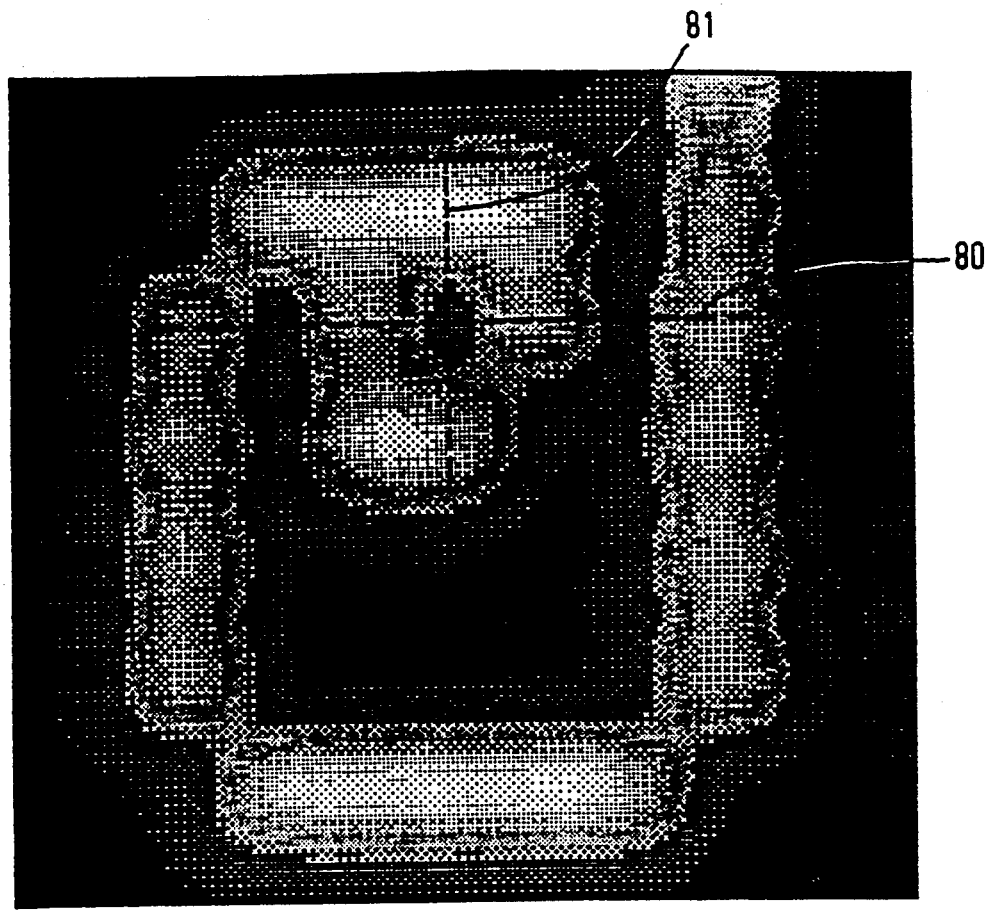
FIGS. 8a and 8b illustrate a further example of the method according to the invention.
Figure 8B:
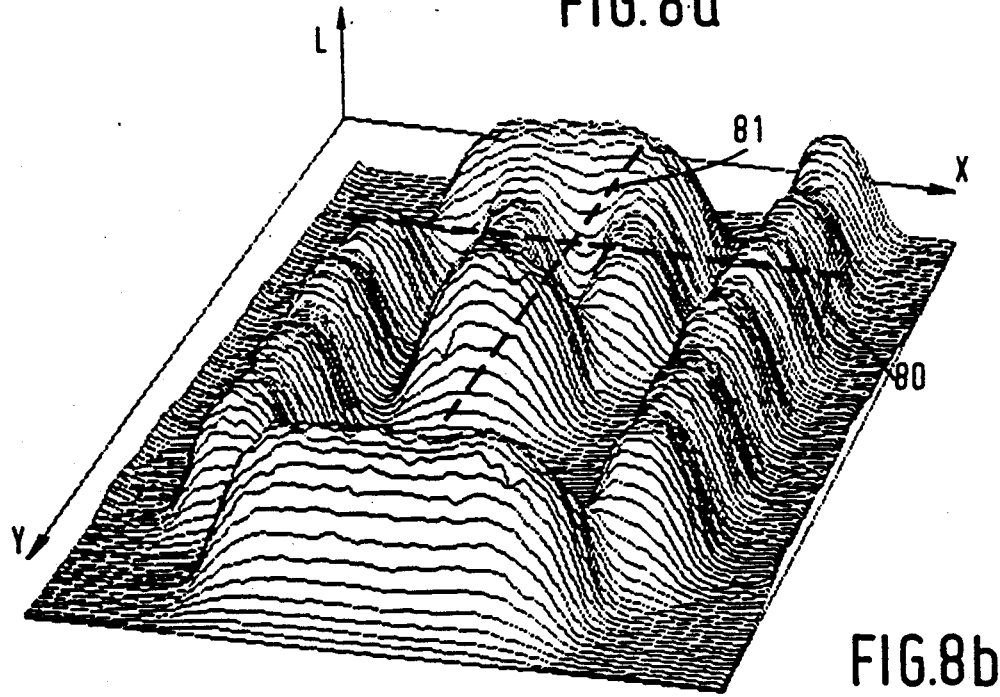

The image pattern may be contained in a character. FIG. 8a shows, for example, a portion of the character @. FIG. 8b shows the luminance L as a function of x and y. The modulation depth can be measured along the lines 80 and 81.

An embodiment of the method in accordance with the invention, is characterized in that the fundamental frequency component of the image pattern is determined, thereafter a processing operation is performed on the display tube, for example a processing operation on the display window, whereafter the said frequency component is determined again, and the frequency component determined last is compared to the previously determined frequency component. In this manner the influence of, for example, operations performed on the exterior surface of the display window can be determined in a fast and simple manner. Operations performed on the exterior surface of the display window may, for example, be the deposition of an anti-reflection layer or a panel or roughening of the exterior surface.

It will be obvious that within the scope of the invention many variations are possible for a person skilled in the art.

The method of the invention is, for example, not limited by the shape of the picture tube. The colour picture tube shown here is an in-line colour picture tube, the method of the invention can however also be applied to other types of picture tubes, for example a flat picture tube, an index picture tube, a monochrome picture tube, a projection picture tube, or a picture tube having a $\Delta$-electron gun. The picture tube can alternatively comprise a plurality of electron guns, or an electron gun for generating some dozens of electron beams.

In addition, the method is, for example, not limited by the image pattern examples shown here. The image pattern may extend both in the x and in the y-direction, or in any other direction; the method may have two or more steps, for example a first step in which an image pattern is generated and analysed in one direction, followed by a further step in which an image pattern is generated and analysed in a direction transverse of the first direction; the image pattern may be composed of two or a plurality of repetition patterns in mutually different directions, for example directions which are at right angles to each other. The image pattern may contain two sub-repetition patterns which extend in the same direction but have different fundamental wavelengths.

I claim:

1. A method of determining a display parameter of a picture tube which includes a display screen with a sequential array of triads of luminescent color elements thereon, the spacing of such triads corresponding to a first modulation frequency, means for producing a variable intensity electron beam, and means for deflecting the beam across the screen to cause the triads to produce a luminescent color image; characterized in that the method comprises the steps of:
    (a) frequency modulating the intensity of the electron beam at a second modulation frequency lower than said first modulation frequency, thereby producing a luminescent image pattern on the screen;
    (b) determining luminance values of the image pattern as a function of position on the screen;
    (c) determining from the luminance values a fundamental wave of the image pattern, such fundamental wave having a frequency substantially equal to the second modulation frequency;
    (d) analyzing the fundamental wave of the image pattern to determine a selected characteristic thereof; and
    (e) determining said display parameter of the picture tube from the selected characteristic of the fundamental wave of the image pattern.

2. A method as in claim 1 where the selected characteristic of the fundamental wave is either the depth of modulation or the phase thereof.

3. A method as in claim 1 wherein the picture tube includes a color selection electrode having apertures corresponding to the array of triads of color elements, so that the aperture spacing corresponds to said first modulation frequency, characterized in that the second modulation frequency is at least one-hundredth of the first modulation frequency.

4. A method as in claim 1, 2 or 3 where the luminescent image pattern extends in more than one direction and where said first and second frequencies exist for each of said more than one directions.

5. A method as in claim 4 where the luminescent image pattern is formed from a uniform matrix of points.

6. A method as in claim 1, 2 or 3 where the fundamental wave is determined from those of said luminance values representing the maximum luminance of the image pattern in respective sections of the screen.

7. A method as in claim 1, 2 or 3 where the fundamental wave is determined from those of said luminance values representing the average luminance of the image pattern in respective sections of the screen.

8. A method as in claim 1, 2 or 3 where the intensity of the electron beam is frequency modulated so as to produce a predominantly symmetrical luminescent image pattern on the screen.

9. A method as in claim 1, 2, or 3 where the method steps are performed both before and after modification of a manufacturing operation carried out on the picture tube, to determine the effect of said manufacturing operation on the display parameter determined by the method steps.

10. A method as in claim 9 where the manufacturing operation relates to the luminescent screen.

* * * * *